No. 877,973. PATENTED FEB. 4, 1908.
I. J. WEBSTER.
COFFEE OR TEA POT.
APPLICATION FILED JUNE 10, 1907.
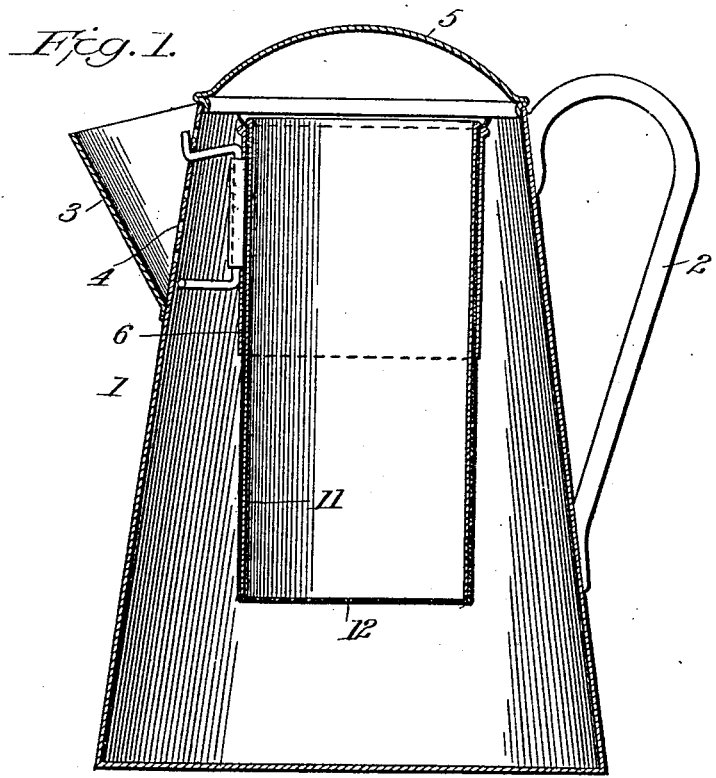
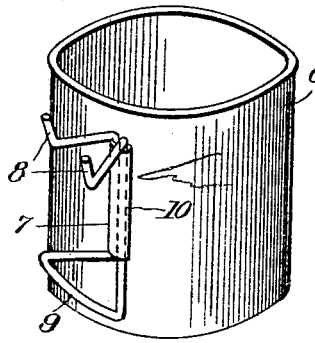
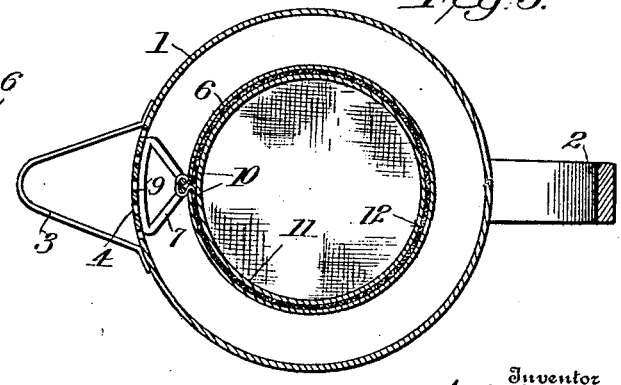

UNITED STATES PATENT OFFICE.

ISRAEL J. WEBSTER, OF PAULDING, OHIO.

COFFEE OR TEA POT.

No. 877,973.    Specification of Letters Patent.    Patented Feb. 4, 1908.

Application filed June 10, 1907. Serial No. 378,182.

*To all whom it may concern:*

Be it known that I, ISRAEL J. WEBSTER, a citizen of the United States, residing at Paulding, in the county of Paulding and State of Ohio, have invented certain new and useful Improvements in Coffee or Tea Pots, of which the following is a specification.

This invention relates to coffee or tea pots. One object of the invention is to provide a holder and strainer for coffee and tea pots.

Another object of the invention resides in the provision of a simple means for suspending the tea or coffee centrally inside of the pot.
A still further object of the invention resides in the provision of a coffee or tea holder and strainer embodying such characteristics that the coffee or tea will not become too strong or receive a bitter taste incident to permitting the coffee or tea grounds to remain in the pot after the making operation has been completed.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details, without departing from the spirit or sacrificing any of the advantages thereof.

In the drawings:—Figure 1 is a vertical sectional view of the invention. Fig. 2 is a detail perspective view of the sleeve including the means for supporting the latter centrally of the pot. Fig. 3 is a transverse sectional view through a coffee pot embodying my invention.
Referring now more particularly to the accompanying drawings, the reference character 1 indicates a coffee or tea pot of ordinary construction including the handle 2, spout 3, strainer 4 and cover 5.
The character 6 designates a sleeve to which is secured a bracket 7 designed to support the sleeve within the pot at the top of the latter and centrally thereof. This bracket is preferably formed of a single piece of material and has its upper end formed into diverging hook members 8 designed to be passed through perforations of the strainer 4 to support the sleeve at the top and bottom, the lower end of the bracket being directed outwardly to form a foot portion 9 for engagement with the inner wall of the pot or with the strainer 4 below the point of the latter at which the hook members 8 engage the same. This hook portion 9 insures a positive positioning of the sleeve 6 centrally of the pot aiding the hook members 8 in performing this function. The bracket 7 is secured in place by means of a fastening 10 formed from a sheet of metal bent upon itself with the terminals thrust through a slit in the sleeve and the terminals bent in opposite directions against the inner face of the sleeve and soldered thereto, as indicated in Fig. 3.

The character 11 indicates an inner sleeve to which is tightly fitted a muslin or other foraminous coffee or tea bag 12, the sleeve 11 being fitted within the sleeve 6 tightly so as to firmly support the bag 12 against displacement. It might be preferred to have the sleeve 11 the same length as the sleeve 6.

In the use of my invention, the tea or coffee is placed within the holder 12 and the boiling water percolating through the holder extracts the flavor from the tea or coffee without permitting the tea or coffee grounds to mix with the liquid, thereby obviating the probability of grounds remaining in the coffee after the making operation has been completed.

A further advantage resides in the fact that the coffee will not become too strong or receive a bitter flavor or taste incident to the coffee grounds being allowed to circulate through the pot.

What is claimed is:—

1. In a device of the class described, the combination with a body including a strainer, of a holder for the material, a fastening device comprising a tubular member connected to said holder, and a bracket formed from a single piece of wire bent intermediate its ends with the intermediate portions disposed within said tubular fastening and the bight portion distended and bent laterally into a triangular foot and bearing against the body and with the free ends bent laterally and passed through the strainer and terminating in upwardly directed fingers lying against the outer face of the strainer.

2. In a device of the class described, the combination with a body including a strainer, of a holder for the material and having a vertical slit, a fastening device comprising a member formed of sheet metal bent into a tube with the terminals thrust through said slit and extended in opposite directions within the holder, and a bracket formed from a single piece of wire bent intermediate its ends with the intermediate portion disposed within the tubular portion of said fastening device and the bight portion distended and bent laterally into a triangular foot and bearing against the body and with the free ends bent laterally and passed through the strainer and terminating in upwardly directed fingers lying against the outer face of the strainer.

3. In a coffee or tea pot, the combination with a body including a strainer; of a sleeve; a bracket secured to the sleeve, said bracket being formed of a single piece of material bent intermediate its ends and formed into a triangular shaped foot portion for engagement with the inner face of said strainer with its extremities bent to provide diverging arms terminating in fingers, the arms and fingers being inserted through perforations of the strainer the fingers lying against the outer face of the strainer whereby the sleeve may be supported centrally of the body, a second sleeve within the aforesaid sleeve; and a coffee or tea holder supported between said sleeves.

In testimony whereof I affix my signature, in presence of witnesses.

ISRAEL J. WEBSTER.

Witnesses:
T. H. MARSHALL,
L. C. BASHORE,
N. R. WEBSTER.